United States Patent [19]

Yamaya et al.

[11] Patent Number: 6,147,156

[45] Date of Patent: Nov. 14, 2000

[54] SILICONE RESIN-CONTAINING EMULSION COMPOSITION, MAKING METHOD, AND ARTICLE HAVING CURED FILM OF THE COMPOSITION

[75] Inventors: Masaaki Yamaya; Masahiro Furuya; Hiroaki Kizaki; Akira Yamamoto, all of Gunma-ken, Japan

[73] Assignee: Shin-Etsu Chemical Co., Ltd., Tokyo, Japan

[21] Appl. No.: 09/267,219

[22] Filed: Mar. 12, 1999

[30] Foreign Application Priority Data

Mar. 13, 1998 [JP] Japan .................................. 10-082738

[51] Int. Cl.$^7$ ........................................................ C08F 2/22
[52] U.S. Cl. ........................... 524/806; 524/801; 524/849; 524/588; 525/100; 556/459; 556/458; 528/10; 528/501
[58] Field of Search .................................... 524/801, 806, 524/849, 588; 525/100; 528/10, 501; 556/458, 459

[56] References Cited

U.S. PATENT DOCUMENTS

| 4,642,238 | 2/1987 | Lin et al. . |
| 4,999,249 | 3/1991 | Deschler et al. . |
| 5,844,060 | 12/1998 | Furuya et al. . |
| 5,973,068 | 10/1999 | Yamaya et al. . |

FOREIGN PATENT DOCUMENTS

| 0541395A1 | 5/1993 | European Pat. Off. . |
| 0098940 | 1/1994 | European Pat. Off. . |
| 0752441A2 | 1/1997 | European Pat. Off. . |
| 0757059A1 | 2/1997 | European Pat. Off. . |
| 0841355A2 | 5/1998 | European Pat. Off. . |
| 0857770A2 | 8/1998 | European Pat. Off. . |
| 58-213046 | 12/1983 | Japan . |
| 61-9463 | 1/1986 | Japan . |
| 62-179369 | 8/1987 | Japan . |
| 345628 | 2/1991 | Japan . |
| 3115485 | 5/1991 | Japan . |
| 3200793 | 9/1991 | Japan . |
| 5209149 | 8/1993 | Japan . |
| 06344665 | 12/1994 | Japan . |
| 07196750 | 8/1995 | Japan . |
| 07247434 | 9/1995 | Japan . |
| 08003409 | 1/1996 | Japan . |
| 08027347 | 1/1996 | Japan . |
| 08060098 | 3/1996 | Japan . |
| 1149935 | 4/1969 | United Kingdom . |

OTHER PUBLICATIONS

Chemical Abstracts: vol. 130, Abstract No. 353753 (XP002107188).

*Primary Examiner*—Robert Dawson
*Assistant Examiner*—Kuo-Liang Peng
*Attorney, Agent, or Firm*—Birch, Stewart, Kolasch & Birch, LLP

[57] ABSTRACT

A silicone resin-containing emulsion composition is based on a silicone resin-containing emulsion obtained by emulsion polymerization of a mixture containing (A) a silanol group-bearing silicone resin and (B) a radical-polymerizable vinyl monomer. The silicone resin (A) contains 30–100 mol % of T units: $R^1$—$SiZ_3$, and specifically 30–80 mol % of T-2 units: $R^1$—$Si(OH)Z'_2$ among other T units wherein $R^1$ is a monovalent hydrocarbon group, Z is a OH group, hydrolyzable group or siloxane residue, and Z' is a siloxane residue, and has a number average molecular weight of at least 500. The composition has a good film forming ability and cures into a flexible film having mar, weather and chemical resistance.

15 Claims, No Drawings

SILICONE RESIN-CONTAINING EMULSION COMPOSITION, MAKING METHOD, AND ARTICLE HAVING CURED FILM OF THE COMPOSITION

BACKGROUND OF THE INVENTION

1. Field of the Invention

This invention relates to a silicone resin-containing emulsion composition having film-forming ability and providing cured films having improved properties including mar resistance, weather resistance and chemical resistance, a method for preparing the same, and an article having a cured film of the composition.

2. Prior Art

In the paint and coating field, a change of dispersing media from organic solvents to aqueous systems is desired from the standpoints of environmental protection and safe working environment.

To meet such demands, emulsion paints obtained by emulsion polymerizing radical-polymerizable vinyl monomers as typified by acrylic resin systems are widely employed as the base of coating compositions because of their good film-forming ability and chemical resistance. However, coating compositions of this type have the drawback that they essentially lack water resistance and weather resistance.

On the other hand, silicone resins resulting from hydrolytic condensation of silane compounds have found acceptance as the coating agent since they are able to form films having a high hardness and satisfactory weather resistance, water resistance, heat resistance and water repellency. However, they have the drawbacks that film-forming ability, alkali resistance, and film flexibility are poor, and shelf stability is also poor due to the high condensation activity of silanol groups. Also, the silicone resins are generally used in the form of solutions in organic solvents, which have such problems as the hazard of fire or explosion, toxicity to humans, and environmental contamination. It is thus desired to have silicone resin compositions of the emulsion type.

To overcome the above and other drawbacks, a number of attempts have been made as described below although they are still unsatisfactory.

(a) JP-A 213046/1983, 197369/1987, 115485/1991, and 200793/1991 disclose a method of emulsifying alkoxysilane compounds or partial hydrolytic condensates thereof with the aid of surfactants to form aqueous emulsions. It is also known to mix this emulsion with an emulsion resulting from emulsion polymerization of a polymerizable vinyl monomer (JP-A 344665/1994).

(b) JP-A 247434/1995 discloses a method of forcedly mechanically grinding and dispersing a solventless solid silicone resin along with a chain silicone compound to form an aqueous emulsion.

(c) JP-A 60098/1996 discloses a method of emulsion polymerizing a radical-polymerizable vinyl monomer in the presence of an aqueous polymer resulting from hydrolysis of an alkoxysilane in water without using a surfactant.

(d) JP-A 209149/1993 and 196750/1995 disclose a method comprising hydrolyzing and condensing an alkoxysilane mixture containing a vinyl-polymerizable alkoxysilane to form an aqueous emulsion containing a solid silicone resin, adding a radical-polymerizable vinyl monomer thereto, and effecting emulsion polymerization, thereby forming a graft copolymer fine particle (solid) emulsion.

(e) JP-A 45628/1991 and 3409/1996 disclose a method for introducing a silicone resin into emulsion particles by adding an alkoxysilane to an emulsion resulting from emulsion polymerization of a radical-polymerizable vinyl monomer, and effecting hydrolytic condensation.

(f) JP-A 9463/1986 and 27347/1996 disclose a method of emulsion polymerizing a vinyl-polymerizable functional group-containing alkoxysilane with a radical-polymerizable vinyl monomer to form an emulsion.

However, method (a) has the drawbacks that active alkoxy groups are susceptible to hydrolysis with the lapse of time to form an alcohol, which is an organic solvent, as a by-product in the system, and a relatively low polymeric raw material converts to a higher molecular weight one. As a result, the alcohol by-product renders the emulsion unstable, and the characteristics are variable because of a changing degree of polymerization. These drawbacks can be compensated for by using a large amount of surfactant, but at the sacrifice of film properties including hardness and water resistance. Additionally, since the system is based on a silicone resin alone, the drawbacks inherent to the silicone resin are maintained and film properties are not fully satisfactory.

In method (b), particles of a solid silicone resin having a softening point are forcedly emulsified along with a chain organopolysiloxane having an OH group at each end with the aid of a surfactant. This method has the advantage that no organic solvents are contained, but the drawback that the solid silicone resin, because of its high polarity, is difficultly dissolvable in low polar liquid organopolysiloxane. Since this requires to use a sand grinder in dispersing the solid resin, it is difficult to reduce the size of particles and therefore, the resulting emulsion remains less stable. Because of the solid resin, the content of silanol groups is as low as 0.1 to 5% by weight, which requires high temperatures of 200 to 300° C. for curing. Then the working efficiency is lower than the organic solvent type. Because of the combined use of chain organopolysiloxane, the cured film is fully water repellent, but is low in hardness and thus unsatisfactory in mar resistance and durability.

Method (c) starts with simple hydrolysis of an alkoxysilane in water to form a water-soluble resin free of a surfactant. A surfactant is then added thereto, after which a radical-polymerizable vinyl monomer is emulsion polymerized. However, this method also has the disadvantage that hydrolysis in water is accompanied by formation of an alcohol by-product. The water-soluble silicone resin is partially incorporated in the emulsion particles, but the majority is left in water because of a high water solubility. Highly active silanol groups contained in the molecules in water gradually undergo condensation, precipitating as a gel-like matter. As a consequence, the emulsion tends to become unstable. Since the silicone resin component and the vinyl polymerizable component are essentially incompatible with each other and the respective components are not uniformly distributed within the cured film, film properties become poor. Method (c) is not fully satisfactory.

In method (d), alkoxysilanes are hydrolyzed in water to form an emulsion of a corresponding solid silicone resin. Utilizing vinyl polymerizable groups in the silicone resin as starting points, acrylic chains are then grafted by emulsion polymerization. Since this method also involves the hydrolysis step of alkoxysilanes, the system contains an alcohol which is an organic solvent. Therefore, the emulsion remains relatively unstable. Aiming to provide solid fine particles capable of imparting lubricity and water repellency, this method is to prepare composite particles in which the silicone resin serving for that function is located at the center of the core and acrylic chains contributing to anti-agglomeration of particles in water and improved dispersion are grafted thereto. Accordingly, this method favors that both the components are present in a non-uniform state, and that the silicone resin undergoes full crosslinking within the particles and rather, contains no silanol groups and is thus inactive. No satisfactory cured films are obtained.

Since an alkoxysilane is post added to an emulsion in method (e), like the other methods, method (e) has the drawback that an alcohol by-product is formed and the complete incorporation of the silicone resin in emulsion particles is difficult. The stability of the emulsion and the properties of cured film are below the satisfactory level. Because of the post-addition, there is a high possibility that a greater proportion of the silicone resin is present in the shell. Therefore, both the components within particles and cured film are non-uniform and the compensation of properties by both the resins is insufficient.

In method (f), a vinyl-polymerizable functional group-containing alkoxysilane is emulsion polymerized with a radical-polymerizable vinyl monomer. Since the alkoxy groups are restrained of hydrolysis and thus retained, this emulsion eliminates the formation of an alcohol by-product as in the other methods and minimizes the change of properties with time. However, it is difficult to introduce a large proportion of the silicone resin component into the film, and therefore, such properties as weather resistance are least improved and unsatisfactory when the exterior application is considered.

As described above, the prior art known methods fail to provide a silicone resin-containing emulsion which (i) does not contain flammable low-boiling organic solvents such as alcohols, (ii) remains highly stable, (iii) is low-temperature curable, and (iv) forms a uniform cured film having improved properties including mar resistance, weather resistance, and chemical resistance.

Therefore, an object of the present invention is to provide a silicone resin-containing emulsion composition satisfying the above requirements (i) to (iv), a method for preparing the same, and an article having a cured film of the composition.

SUMMARY OF THE INVENTION

We have found that by emulsion polymerizing a mixed solution containing a silanol group-bearing silicone resin (defined as component (A) below) and a radical-polymerizable vinyl monomer (defined as component (B) below) as main components, there is obtained an emulsion which is substantially free of organic solvents (e.g., solvents having a boiling point below 100° C. such as alcohols and ketones and aromatic solvents such as benzene, toluene and xylene), contains the silicone resin of condensation type and the vinyl polymerized resin within common particles in the emulsion, has improved shelf stability, and provides satisfactory film properties. When a film-forming assistant is added to the emulsion, a satisfactory film is obtained by drying and curing the emulsion. When a specific curing catalyst is added, and more specifically when a compound containing a metal element of Group IA or IIA in the Periodic Table is added as the curing catalyst, low-temperature curing properties are improved to such an extent that the emulsion may become fully curable at room temperature.

In a first aspect, the invention provides a silicone resin-containing emulsion composition comprising as a main component a silicone resin-containing emulsion obtained by emulsion polymerization of a mixed solution containing (A) 100 parts by weight of a silanol group-bearing silicone resin comprising 30 to 100 mol % of T units represented by the formula: $R^1$—$SiZ_3$, and specifically 30 to 80 mol % of T-2 units having one silanol group represented by the formula: $R^1$—$Si(OH)Z'_2$ among other T units wherein $R^1$ is a substituted or unsubstituted monovalent hydrocarbon group, Z is a OH group, hydrolyzable group or siloxane residue, and Z' is a siloxane residue, said silicone resin having a number average molecular weight of at least 500, and (B) 10 to 1,000 parts by weight of a radical-polymerizable vinyl monomer.

In one preferred embodiment, the composition further contains (C) up to 20 parts by weight of a film-forming assistant having a boiling point of at least 100° C. per 100 parts by weight of components (A) and (B) combined, or (D) up to 20 parts by weight of at least one compound containing a metal element of Group IA or IIA per 100 parts by weight of components (A) and (B) combined.

In a second aspect, the invention provides a method for preparing a silicone resin-containing emulsion composition comprising the steps of:

(i) hydrolyzing a hydrolyzable silane compound containing 30 to 100 mol % of a silane represented by the formula: $R^1SiX_3$ wherein $R^1$ is as defined above and X is a hydrolyzable group in an aqueous solution at pH 1 to 7, thereby obtaining a reaction mixture containing the silanol group-bearing silicone resin (A) set forth above, (ii) removing hydrolytic by-products from the reaction mixture, leaving a system primarily comprising the silanol group-bearing silicone resin (A) and water, (iii) adding a radical-polymerizable vinyl monomer to the system of step (ii) for dissolving the silanol group-bearing silicone resin (A) in the vinyl monomer, and removing the remaining hydrolytic by-products and water, and (iv) subjecting the silicone resin-containing radical-polymerizable vinyl monomer solution to emulsion polymerization in the presence of a surfactant.

In one preferred embodiment, a film-forming assistant having a boiling point of at least 100° C. is added to the silicone resin-containing radical-polymerizable vinyl monomer solution in step (iv) before emulsion polymerization is effected in the presence of a surfactant, or a film-forming assistant having a boiling point of at least 100° C. is added to the emulsion polymerized product resulting from step (iv).

In a third aspect, the invention provides an article having formed on a substrate a cured film of the silicone resin-containing emulsion composition defined above.

The emulsion composition of the invention has the following advantages which are never accomplished by the prior art known methods.

(i) Since the vinyl monomer is polymerized within emulsion particles in the presence of the silicone resin, both the resins form an interpenetrating network (IPN) structure. As a consequence, even when a methyl silicone resin which is less compatible is used, a highly transparent film is formed in which the properties of both the resins are compensated for. In particular, since the silicone resin featuring hardness, chemical resistance and weather resistance can be contained in a large proportion, the emulsion has a high film-forming ability and the resulting film is uniform and has improved properties including mar resistance, weather resistance, chemical resistance and flexibility.

(ii) Silanol groups having high condensation activity are restricted in degree of freedom since the polymers are intertwined in a solventless state with each other within emulsion particles. As a consequence, condensation of silanol groups is prohibited and shelf stability is retained.

(iii) When the silicone resin contains at least a certain amount of silanol groups having the specific structure, silanol groups are restrained in a good state within emulsion particles so that their high curing activity is maintained intact and curing ability at relatively low temperatures is insured. The containment of a large amount of silanol groups having the specific structure leads to more straight chain structures, enabling to simultaneously impart the contradictory properties of flexibility and hardness to the film.

(iv) Since the emulsion does not contain low-boiling organic solvents having a boiling point of lower than 100° C. or aromatic organic solvents such as toluene, an acceptable working environment is ensured. Since an alcohol component which can promote the breakage of the emulsion is not contained or formed as a by-product, the emulsion is maintained stable enough.

(v) When a conventional well-known film-forming assistant is added, a satisfactory film is obtained after drying and curing. When a specific curing catalyst is added, room temperature curing becomes possible and fast curing at relatively low temperature becomes possible.

Accordingly, the emulsion composition of the invention is suitable as exterior paint to be applied to structures and building members and also applicable to the area where acrylic emulsions, acrylic-silicone resins and silicon resins have been applied.

DETAILED DESCRIPTION OF THE INVENTION

Silanol group-bearing silicone resin

First, the silanol group-bearing silicone resin constituting the present invention is described. This silanol group-bearing silicone resin characterized by (i) comprising 30 to 100 mol % of structural units (or T units) represented by the formula: $R^1$—$SiZ_3$, and specifically 30 to 80 mol % of structural units (or T-2 units) containing only one silanol group represented by the formula: $R^1$—$Si(OH)Z'_2$ among other T units, (ii) having a number average molecular weight of at least 500, and (iii) preferably containing at least 5% by weight of silanol groups.

In the above formulae, $R^1$ represents a substituted or unsubstituted monovalent hydrocarbon group. The unsubstituted monovalent hydrocarbon groups are preferably those of 1 to 10 carbon atoms, for example, alkyl groups such as methyl, ethyl, propyl, isopropyl, butyl, t-butyl, hexyl, cyclohexyl, octyl, and decyl, alkenyl groups such as vinyl, allyl, 5-hexenyl, and 9-decenyl, and aryl groups such as phenyl. Of these, methyl, propyl, hexyl and phenyl are preferred. Where weather resistance is required, methyl is preferred. For water repellency, long-chain alkyl groups are preferred. When it is desired to impart flexibility to a film, the use of phenyl is recommended. It is further preferably that methyl accounts for at least 50 mol %, especially at least 80 mol % of the entire organic groups.

The substituted monovalent hydrocarbon groups are preferably those in which some or all of the hydrogen atoms on the aforementioned unsubstituted monovalent hydrocarbon groups of 1 to 10 carbon atoms are replaced by substituents. Exemplary substituents which can be applied herein include (i) halogen atoms such as fluorine and chlorine, (ii) epoxy functional groups such as glycidoxy and epoxycyclohexyl, (iii) (meth)acryl functional groups such as methacryl and acryl, (iv) amino functional groups such as amino, aminoethylamino, phenylamino, and dibutylamino, (v) sulfur-containing functional groups such as mercapto and tetrasulfide, (vi) alkyl ether functional groups such as (polyoxyalkylene) alkyl ethers, (vii) anionic groups such as carboxyl and sulfonyl, and (viii) quaternary ammonium salt structure-containing groups. Exemplary substituted monovalent hydrocarbon groups include trifluoropropyl, perfluorobutylethyl, perfluorooctylethyl, 3-chloropropyl, 2-(chloromethylphenyl)ethyl, 3-glycidyloxypropyl, 2-(3,4-epoxycyclohexyl)ethyl, 5,6-epoxyhexyl, 9,10-epoxydecyl, 3-(meth)acryloxypropyl, (meth)acryloxymethyl, 11-(meth)acryloxyundecyl, 3-aminopropyl, N-(2-aminoethyl)aminopropyl, 3-(N-phenylamino)propyl, 3-dibutylaminopropyl, 3-mercaptopropyl, 2-(4-mercaptomethylphenyl)ethyl, polyoxyethyleneoxypropyl, 3-hydroxycarbonylpropyl and 3-tributylammonium propyl. The use of epoxy, amino and mercapto functional groups is desirable for enhancing adhesion to the substrate. For close blocking with a vinyl polymer, the use of radical-polymerizable (meth)acryl functional groups, or mercapto functional groups which act as a chain transfer agent, is preferred. When attempting crosslinkage with a vinyl polymer using bonds other than siloxane bonds, it is sufficient to introduce functional groups capable of reacting with the organic functional groups on the vinyl polymer, with examples of such functional groups being epoxy groups (reacting with hydroxy, amino, or carboxyl groups) and amino groups (reacting with epoxy or acid anhydride groups).

In the above formulae, Z is a OH group, hydrolyzable group or siloxane residue, and Z' is a siloxane residue. Examples of the hydrolyzable group include alkoxy groups such as methoxy, ethoxy, propoxy, isopropoxy, butoxy, sec-butoxy, and t-butoxy, alkenoxy groups such as isopropenoxy, acyloxy groups such as phenoxy and acetoxy, oxime groups such as butanoxime, and amino groups. Of these, alkoxy groups are preferred. The use of methoxy, ethoxy, isopropoxy, and butoxy groups is especially preferred for ease of control of hydrolysis and condensation. The siloxane residue designates a substituent which is attached to the adjoining silicon atom through an oxygen atom to form a siloxane bond and is represented by —O—Si≡.

In the present invention, the T units represented by the formula: $R^1$—$SiZ_3$ are structural units substantially governing the crosslinking degree and curability of the silicone resin and contained in an amount of 30 to 100 mol %. With less than 30 mol % of T units, the resulting film has low hardness and curability becomes poor. In order that the silicone resin be uniformly intertwined with the vinyl-polymerized polymer within emulsion particles to control the degree of freedom of active silanol groups, the silicone resin must impart constitutive property. The preferred content of T units is in the range of 50 to 100 mol % because the silicone resin becomes robust and shelf stability is improved.

As other structural units, the silicone resin may contain 0 to 10 mol % of M units represented by $R^1_3SiZ$, 0 to 50 mol % of D units represented by $R^1_2SiZ_2$ or 0 to 30 mol % of Q units represented by $SiZ_4$ in admixture with the T units. The combined use of Q units is preferable for further increasing the hardness of the cured film whereas the combined use of D units is preferably for imparting flexibility to the cured film.

The silanol group-bearing silicone resin according to the invention should contain, among the T units of $R^1$—$SiZ_3$, 30 to 80 mol % of T-2 units having only one silanol group represented by the formula: $R^1$—Si(OH)$Z'_2$. Herein, since the siloxane residue Z' is also represented by —O—Si≡ as described above, the T-2 units may also be represented by the formula: $R^1$—Si(OH)(—O—Si≡)$_2$.

In order to provide the cured film with a hardness, a the silicone resin must contain specified amounts of T units. In order to impart flexibility to the cured film while maintaining good curability and good compatibility with the vinyl polymer formed within particles, the silicone resin must contain 30 to 80 mol % of T-2 units among other T units. If the content of T-2 units is less than 30 mol %, the absolute amount of silanol groups contributing to curing of the silicone resin becomes short so that the film becomes undercured. In order to produce a silicone resin having a T-2 unit content in excess of 80 mol %, the degree of polymerization must be suppressed low although at a low degree of polymerization, it is difficult to form a chain or cyclic structure so that the cured film becomes highly crystalline and hence, less flexible. Another problem of a T-2 unit content in excess of 80 mol % is a loss of shelf stability due to a higher degree of freedom within particles. More preferably, among the entire T units, the T-2 units are contained in an amount of 35 to 70 mol %.

Next, the number average molecular weight of the silanol group-bearing silicone resin used herein is described. In order to provide the above-described properties, the silicone resin must be given a certain constitutive property. To secure such a constitutive property, the silicone resin must be high molecular. In this respect, the silicone resin used must have a number average molecular weight of at least 500. A silicone resin with a number average molecular weight below 500 has no appropriate constitutive property, and thus lacks flexibility and storage stability. A number average molecular weight of at least 1,000 is preferred. The upper limit of the number average molecular weight is not critical though it is usually about 50,000.

In addition to satisfying the above-described requirements, the silicone resin which can be used herein should preferably contain an appropriate amount of silanol groups, typically at least 5% by weight, especially 6 to 20% by weight based on the silicone resin of silanol groups. Less than 5% by weight of silanol groups would result in a cured film with lower hardness because the amount of silanol groups contributing to crosslinking is short.

Insofar as the above-described requirements are met, the silicone resin may be prepared by any desired method. One illustrative method is described below.

The raw material from which the silicone resin is prepared may be any of hydrolyzable silane compounds having hydrolyzable groups such as alkoxy, alkenoxy, acyloxy, chloro, amino and oxime groups or partial hydrolytic condensates thereof. For ease of control of hydrolysis reaction or ease of treatment of hydrolytic by-products and from an economical aspect, alkoxy groups or chlorine atoms, especially alkoxy groups are preferred as the hydrolyzable groups. When chlorine atoms are used, it is preferred to completely hydrolyze the chlorine atoms so that no chlorine atoms are left in the silicone resin. Any of silane compounds having 1, 2, 3 or 4 hydrolyzable groups per silicon atom and organic substituents satisfying the above requirements may be used although it is preferable to use a hydrolyzable silane compound having three hydrolyzable groups X, as represented by $R^1SiX_3$, in an amount of 30 to 100 mol %, and especially 50 to 100 mol % based on the entire hydrolyzable silane compounds. It will be understood that the other hydrolyzable silane compounds used herein are represented by $SiX_4$, $R^1_2SiX_2$, and $R^1_3SiX$.

Illustrative examples of the silane compound which can be used herein include tetrafunctional silanes (having four hydrolyzable groups) $SiX_4$ such as tetrachlorosilane, tetramethoxysilane, tetraethoxysilane, and tetrabutoxysilane;

trifunctional silanes (having three hydrolyzable groups) $R^1SiX_3$ such as methyltrichlorosilane, methyltrimethoxysilane, methyltriethoxysilane, methyltriisopropoxysilane, methyltributoxysilane, methyltriisopropenoxysilane, ethyltrichlorosilane, ethyltrimethoxysilane, propyltrichlorosilane, butyltrichlorosilane, butyltrimethoxysilane, hexyltrichlorosilane, hexyltrimethoxysilane, decyltrichlorosilane, decyltrimethoxysilane, phenyltrichlorosilane, phenyltrimethoxysilane, cyclohexyltrichlorosilane, and cyclohexyltrimethoxysilane;

difunctional silanes (having two hydrolyzable groups) $R^1_2SiX_2$ such as dimethyldichlorosilane, dimethyldimethoxysilane, dimethyldiethoxysilane, dimethyldiisopropoxysilane, dimethyldibutoxysilane, dimethyldiisopropenoxysilane, propylmethyldichlorosilane, propylmethyldimethoxysilane, hexylmethyldichlorosilane, hexylmethyldimethoxysilane, phenylmethyldichlorosilane, phenylmethyldimethoxysilane, diphenyldichlorosilane, and diphenyldimethoxysilane;

monofunctional silanes (having one hydrolyzable group) $R^1_3SiX$ such as trimethylchlorosilane, trimethylmethoxysilane, trimethylethoxysilane, trimethylisopropenoxysilane, and dimethylphenylchlorosilane;

silane coupling agents having organic functional groups such as vinyltrichlorosilane, vinyltrimethoxysilane, vinyltriethoxysilane, 5-hexenyltrimethoxysilane, 3-glycidoxypropyltrimethoxysilane, 3-glycidoxypropyltriethoxysilane, 3-(meth)acryloxypropyltrimethoxysilane, 3-(meth)acryloxypropyltriethoxysilane, 4-vinylphenyltrimethoxysilane, 3-(4-vinylphenyl)propyltrimethoxysilane, 4-vinylphenylmethyltrimethoxysilane, 3-aminopropyltrimethoxysilane, 3-aminopropyltriethoxysilane, 3-(2-aminoethyl)aminopropyltrimethoxysilane, 3-mercaptopropyltrimethoxysilane, 3-mercaptopropyltriethoxysilane, vinylmethyldichlorosilane, vinylmethyldimethoxysilane, vinylmethyldiethoxysilane, 3-glycidoxypropylmethyldimethoxysilane, 3-glycidoxypropylmethyldiethoxysilane, 3-(meth)acryloxypropylmethyldimethoxysilane, 3-(meth)acryloxypropylmethyldiethoxysilane, 3-aminopropylmethyldimethoxysilane, 3-aminopropylmethyldiethoxysilane, 3-mercaptopropylmethyldimethoxysilane, and 3-mercaptopropylmethyldiethoxysilane, and partial hydrolyzates thereof. Inter alia, alkoxysilanes, especially methoxysilanes and ethoxysilanes are preferred because of the ease of operation and distillation of by-products. The organosilicon compound which can be used herein is not limited to the foregoing examples. A mixture of two or more of these silane compounds is also useful.

The silanol group-bearing silicone resin which can be used herein is characterized in that it is obtained by hydrolyzing a hydrolyzable silane compound in an aqueous solution. By effecting hydrolysis under hydrophilic conditions containing substantially no organic solvents, a silicone resin containing a substantial proportion of T-2 units characterizing the present invention and having rich constitutive property is obtained. This silicone resin is prepared through the following steps.

A first stage is the hydrolytic condensation of any of the above-mentioned hydrolyzable organic silane compounds in an aqueous solution at pH 1 to 7. An appropriate amount of water used in hydrolysis is 50 to 5,000 parts by weight per 100 parts by weight of the silane compound or a mixture of silane compounds blended in a composition satisfying the above requirements. Less than 50 parts by weight of water corresponds to a smaller amount of water available in the reaction system in which it is difficult to control the reactivity of silanol groups and sometimes impossible to confer constitutive property. With more than 5,000 parts by weight of water, the concentration of the raw material or silane is so low that condensation reaction is slowed down.

Hydrolysis is effected by adding the silane compound to an aqueous solution followed by agitation. To promote hydrolysis, especially initial hydrolysis, a hydrolytic catalyst may be added. The hydrolytic catalyst may be added to either the aqueous solution prior to the addition of the silane compound or a dispersion obtained after dispersing the silane compound in the aqueous solution. The hydrolytic catalyst may be selected from prior art well-known catalysts, preferably those catalysts which form aqueous solutions exhibiting an acidity of pH 1 to 7. Especially preferred are acidic halogenic acids, carboxylic acids, and sulfonic acids, acidic or weakly acidic inorganic salts, and solid acids such as ion exchange resins. Exemplary are hydrofluoric acid, hydrochloric acid, nitric acid, sulfuric acid, organic acids such as acetic acid and maleic acid, methylsulfonic acid, and cation exchange resins having sulfonic acid or carboxylic acid groups at the surface. The amount of the hydrolytic catalyst used is preferably 0.001 to 10 mol % based on the moles of the hydrolyzable group on a silicon atom. Under strongly acidic conditions below pH 1, or under alkaline conditions above pH 7, silanol groups become very unstable. More preferably, the aqueous solution used is at pH 2 to 6. Since the amount of water is largely excessive relative to the amount of hydrolyzable groups, hydrolysis proceeds to completion. By stirring the solution at room temperature or elevated temperature under such conditions, mutual condensation of silanol groups readily proceeds. Since hydrolytic by-products are present in the system at this stage, the silane reaction mixture which is a precursor of the silanol group-bearing silicone resin is present dissolved in the solution.

A second stage is the step of removing the hydrolytic by-products from the solution containing the reaction mixture, yielding a system primarily containing the silanol group-bearing silicone resin and water. More particularly, the silane reaction mixture-containing solution resulting from the first step is converted into a system consisting essentially of the silanol group-bearing silicone resin and water by heating at a temperature of lower than 80° C., preferably about 30 to 70° C. under atmospheric pressure or by evacuating to a pressure of 20 mmHg to below atmospheric pressure at a temperature of room temperature to 80° C., preferably room temperature to 70° C., thereby distilling off the hydrolytic by-products such as alcohols. In this step, the silicone resin increases a degree of condensation and at the same time, is given a high constitutive property. The silicone resin which has grown into a straight chain in the first stage increases its molecular weight with the progress of condensation and gradually loses hydrophilicity. Almost all the external medium in which the silicone resin is dissolved is water. Since a silicone resin maintaining water solubility or dispersibility is advantageous from the energy aspect, it tends to take a form with its hydrophilic silanol groups oriented to the outside water phase. There results a silicone resin containing a large proportion of silanol groups which is, in turn, composed mainly of T-2 units forming a straight-chain structure providing flexibility and having grown to a sufficient level to impart flexibility. Heating to a temperature above 80° C. in this stage is undesirable because the once formed T-2 units further undergo condensation and thus convert to non-crosslinkable T-3 units ($R^1$—Si(—O—Si≡)$_3$). Therefore, in order to keep the condensation-active T-2 units intact, it is recommended to effect heating and distillation at as low a temperature as possible. After the hydrolytic by-products are removed by an amount of 30 to 100% of their formed amount, the silanol group-bearing silicone resin becomes undissolvable in the solution and the solution becomes slightly or white turbid. If the amount of removal is less than 30%, the growth of the silicone resin is undesirably insufficient. It is preferred to remove the hydrolytic by-products by an amount of 50 to 100% of their formed amount. The silicone resin which now becomes insoluble in the water phase will settle if it is allowed to stand.

In a third stage, the thus obtained silicone resin is dissolved in a polymerizable vinyl monomer to form its solution, which is preferably separated from the water phase. At this point, the majority of the hydrolytic by-products which are fully water soluble remain dissolved in the water phase and thus separated and removed. The amount of the hydrolytic by-products such as alcohols left in the solution should preferably be limited to 10% by weight or less, especially 5% by weight or less of the solution in order to maintain the desired emulsion stable. If the removal of the hydrolytic by-products is insufficient, they may be removed by further water washing. Then there is obtained a polymerizable vinyl monomer solution having the silicone resin dissolved therein which does contain little or substantially no organic solvent.

Radical-polymerizable vinyl monomer

A second component for use to form the emulsion according to the invention is a radical-polymerizable vinyl monomer. The radical-polymerizable vinyl monomer may be selected from prior art well-known vinyl monomers which are radical-polymerizable. Included are (a) alkyl (meth) acrylates whose alkyl group has 1 to 18 carbon atoms, such as methyl, ethyl, propyl, isopropyl, butyl, isobutyl, octyl, 2-ethylhexyl, lauryl, stearyl and cyclohexyl esters of acrylic acid and methacrylic acid; (b) vinyl monomers containing a carboxyl group or anhydride thereof such as acrylic acid, methacrylic acid and maleic anhydride; (c) hydroxyl group-containing vinyl monomers such as 2-hydroxyethyl (meth) acrylate and 2-hydroxypropyl (meth)acrylate; (d) amide group-containing vinyl monomers such as (meth) acrylamide, N-methylol (meth)acrylamide, N-methoxymethyl (meth)acrylamide, N-butoxymethyl (meth)acrylamide, and diacetone (meth)acrylamide; (e) amino group-containing vinyl monomers such as dimethylaminoethyl (meth)acrylate and diethylaminoethyl (meth) acrylate; (f) alkoxy group-containing vinyl monomers such as methoxyethyl (meth)acrylate and butoxyethyl (meth) acrylate; (g) glycidyl group-containing vinyl monomers such as glycidyl (meth)acrylate and glycidyl allyl ether; (h)

vinyl ester monomers such as vinyl acetate and vinyl propionate; (i) aromatic vinyl monomers such as styrene, vinyltoluene and α-methylstyrene; (j) vinyl cyanide monomers such as (meth)acrylonitrile; (k) vinyl halide monomers such as vinyl chloride and vinyl bromide; (l) vinyl monomers containing at least two radical-polymerizable unsaturated groups in a molecule such as divinyl benzene, allyl (meth)acrylate, ethylene glycol di(meth)acrylate, diethylene glycol di(meth)acrylate, and trimethylolpropane tri(meth)acrylate; (m) (poly)oxyethylene chain-containing vinyl monomers such as (poly)oxyethylene mono(meth)acrylates having 1 to 100 ethylene oxide groups; (n) diorganopolysiloxanes having a radical-polymerizable functional group at one end and containing 1 to 200 siloxane units such as dimethylpolysiloxane having a (meth)acryloxypropyl group at one end and dimethylpolysiloxane having a styryl or α-methylstyryl group at one end; and (o) vinylpolymerizable functional group-bearing hydrolyzable silanes of formula (1) to be described later, for example, silane compounds having a radical-polymerizable functional group such as vinyltrimethoxysilane, vinyltriethoxysilane, vinylmethyldimethoxysilane, vinylmethyldiethoxysilane, 5-hexenyltrimethoxysilane, 3-(meth)acryloxypropyltrimethoxysilane, 3-(meth)acryloxypropyltriethoxysilane, 3-(meth)acryloxypropylmethyldimethoxysilane, 3-(meth)acryloxypropylmethyldiethoxysilane, 4-vinylphenyltrimethoxysilane, 3-(4-vinylphenyl)propyltrimethoxysilane, and 4-vinylphenylmethyltrimethoxysilane, and vinyl monomers containing a hindered amine group such as 2,2,6,6-tetramethyl-4-piperidinyl group. These vinyl monomers may be used alone or in admixture of two or more.

Preferably, an alkyl (meth)acrylate having an alkyl group of 1 to 18 carbon atoms accounts for 1 to 100 mol % of the radical-polymerizable vinyl monomer. If the alkyl (meth)acrylate content is less than 1 mol %, chemical resistance and other properties would sometimes be lost. An alkyl (meth)acrylate content of 30 to 99 mol % is more preferred. When it is desired to impart solvent resistance or chemical resistance to the cured film, a radical-polymerizable vinyl monomer having a crosslinkable functional group is preferably copolymerized. Inter alia, the silane compounds of class (o) having a radical-polymerizable functional group are preferred because they can form a siloxane linkage through condensation reaction. Also the glycidyl group-containing vinyl monomers of class (g) such as glycidyl (meth)acrylate and glycidyl allyl ether are preferred because they have an epoxy functional group which is crosslinkable through ring-opening reaction between carboxylic acid and epoxy group. The silane compounds of class (o) are more appropriate in the system of the invention because the other component is a silicone resin having silanol groups. The silane compounds which can be used herein are preferably hydrolyzable silanes having a vinyl polymerizable functional group represented by the following general formula (1).

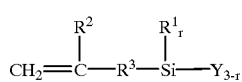
(1)

In the formula, $R^1$ is as defined above, $R^2$ is hydrogen or methyl, $R^3$ is a divalent organic group of 1 to 10 carbon atoms such as alkylene, arylene and alkylene arylene groups in which an oxygen atom or an oxygen-containing group such as —COO— may intervene, Y is a hydrolyzable group, and letter r is equal to 0, 1 or 2.

Examples of the group represented by $R^3$ are given below.

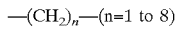

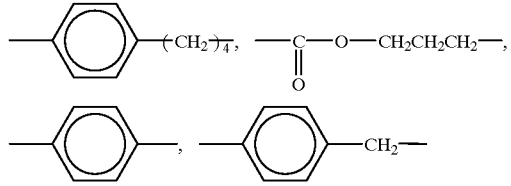

Examples of the hydrolyzable group represented by Y are the same as described above.

Preferably, the amount of the hydrolyzable silane having a vinyl polymerizable functional group used is 0.01 to 10 mol %, especially 0.1 to 5 mol % of the entire radical-polymerizable vinyl monomer. Outside this range, a less amount would fail to achieve sufficient crosslinking with the silicone resin whereas a larger amount would undesirably result in a cured film which is too hard and lacks flexibility.

When it is desired to impart lubricity to the film surface, the diorganopolysiloxanes of class (n) having a radical-polymerizable functional group at one end are preferably copolymerized.

With respect to the mixing ratio, 10 to 1,000 parts by weight of the radical-polymerizable vinyl monomer as the second component is used per 100 parts by weight of the silicone resin as the first component. With less than 10 parts of the vinyl monomer, film formability and chemical resistance would be insufficient. With more than 1,000 parts of the vinyl monomer, weather resistance and water resistance would be insufficient. Preferably, 30 to 500 parts by weight of the radical-polymerizable vinyl monomer is used per 100 parts by weight of the silicone resin.

The silicone resin-containing emulsion composition according to the invention contains as a main component an emulsion polymerized product of a mixture of (A) the silanol group-bearing silicone resin and (B) the radical-polymerizable vinyl monomer, both defined above. The process for preparing this emulsion polymerized product involves the steps of:

(i) hydrolyzing the above-described hydrolyzable silane compound in an aqueous solution at pH 1 to 7, thereby forming a reaction mixture containing the silanol group-bearing silicone resin, (ii) removing the hydrolytic by-products from the reaction mixture, thereby yielding a system primarily containing the silanol group-bearing silicone resin and water, (iii) adding the radical-polymerizable vinyl monomer to the system primarily containing the silanol group-bearing silicone resin and water for dissolving the silanol group-bearing silicone resin in the vinyl monomer and removing the residual hydrolytic by-products and water, and (iv) emulsion polymerizing the solution of the silanol group-bearing silicone resin in the radical-polymerizable vinyl monomer in the presence of a surfactant.

Of these steps, steps (i), (ii) and (iii) are as previously described. In step (iv), the solution of the silanol group-bearing silicone resin in the radical-polymerizable vinyl monomer obtained from step (iii) after removing the residual hydrolytic by-products and water is subject to emulsion polymerization.

Upon emulsion polymerization, a surfactant is used. The surfactant which can be used herein includes well-known nonionic, cationic, and anionic surfactants and reactive emulsifiers having a functional group capable of radical polymerization. Examples of the surfactant include nonionic surfactants such as polyoxyethylene alkyl ethers, polyoxyethylene alkyl phenyl ethers, polyoxyethylene carboxylates, sorbitan fatty acid esters, and polyoxyethylene sorbitan fatty acid esters; cationic surfactants such as alkyltrimethylammonium chloride and alkylbenzylammonium chloride; anionic surfactants such as alkyl or alkylallyl sulfates, alkyl or alkylallyl sulfonates, and dialkyl sulfosuccinates; ampholytic surfactants such as amino acid and betain type surfactants; and various reactive surfactants having in the molecule a hydrophilic group such as sulfonic acid salt, polyoxyethylene chain and quaternary ammonium salt, including radical-polymerizable derivatives of (meth) acrylates, styrene, and maleates as described in JP-A 27347/1996.

These surfactants are illustrated below.

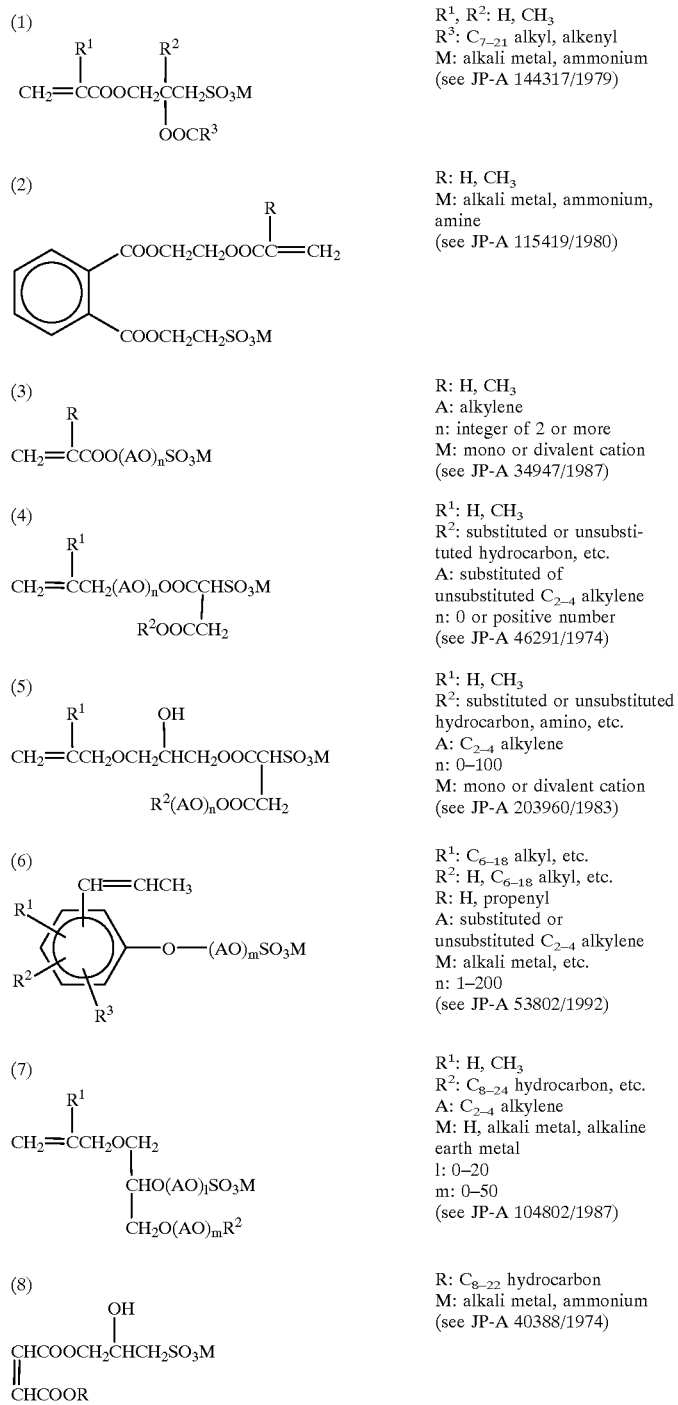

-continued

| | |
|---|---|
| (9) <br> CH$_2$=CCOOCH$_2$CHCH$_2$SO$_3$M <br> with OH on middle carbon <br> CH$_2$COOR | R: C$_{8-22}$ hydrocarbon <br> M: alkali metal, ammonium <br> (see JP-A 40388/1974) |
| (10) <br> CHCOO(AO)$_m$R <br> ‖ <br> CHCOOM | R: alkyl, alkylphenyl <br> A: ethylene <br> M: ammonium, amine, alkali metal <br> m: 9, 12, 14, 28 (Examples) <br> (see JP-A 134658/1977) |
| (11) <br>     R$^1$ <br>     \| <br> CH$_2$=CCO(OCH$_2$CH$_2$)$_n$OR$^2$ | R$^1$: H, CH$_3$ <br> R$^2$: H, CH$_3$, —C$_6$H$_4$—(CH$_2$)$_m$—H <br> n: 4–30 <br> (see JP-A 126093/1978) |
| (12) <br>     R$^1$       CH$_3$ <br>     \|        \| <br> CH$_2$=CCOO(C$_2$H$_4$O)$_x$(CHCH$_2$O)$_y$(C$_2$H$_4$O)$_z$R$^2$ | R$^1$, R$^2$: H, CH$_3$ <br> x: 0–100 <br> y: 0–100 <br> z: 0–100 <br> $1 \leq x + y + z \leq 100$ <br> (see JP-A 28208/1981) |
| (13) 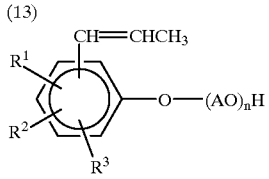 | R$^1$: C$_{6-18}$ alkyl, etc. <br> R$^2$: H, C$_{6-18}$ alkyl, etc. <br> R$^3$: H, propenyl <br> A: substituted or unsubstituted C$_{2-4}$ alkylene <br> n: 1–200 <br> (see JP-A 50204/1992) |
| (14) <br>     R$^1$ <br>     \| <br> CH$_2$=CCH$_2$OCH$_2$ <br>            \| <br>            CHO(AO)$_l$H <br>            \| <br>            CH$_2$O(AO)$_m$R$^2$ | R$^1$: H, CH$_3$ <br> R$^2$: C$_{6-24}$ hydrocarbon, acyl <br> A: C$_{2-4}$ alkylene <br> l: 0–100 <br> m: 0–50 <br> (see JP-A 104802/1987) |
| (15) <br> CH$_2$=CCOO(A$^1$O)$_m$R$^1$ <br>     \| <br>     (CH$_2$)$_l$COO(A$^2$O)$_n$R$^2$ | R$^1$, R$^2$: H, C$_{1-24}$ hydrocarbon, acyl <br> A$^1$, A$^2$: substituted or unsubstituted C$_{2-4}$ alkylene <br> l: 1, 2 <br> m, n: 0, positive number <br> $m + n \geq 3$ <br> $m + n \geq 1$ when R$^1$ = R$^2$ = H <br> (see JP-A 98484/1975) |

The surfactants may be used alone or in admixture of two or more. Preferably the surfactant is used in an amount of 0.5 to 15% by weight, especially 1 to 10% by weight based on the first and second components (effective components) combined. From the emulsion stability standpoint, it is recommended to use the reactive surfactant as part or the entirety of the surfactant used.

A radical polymerization initiator may be used upon emulsion polymerization. Examples of the radical polymerization initiator include persulfates such as potassium persulfate and ammonium persulfate; water-soluble initiators such as aqueous hydrogen peroxide, t-butylhydroperoxide, t-butylperoxymaleic acid, succinic acid peroxide, and 2,2'-azobis-(2-N-benzylamidino)propane hydrochloride; oil-soluble initiators such as benzoyl peroxide, cumene hydroperoxide, dibutyl peroxide, diisopropyl peroxydicarbonate, cumyl peroxyneodecanoate, cumyl peroxyoctoate, and azoisobutyronitrile; and redox systems combined with a reducing agent such as acidic sodium sulfite, Rongalit, and ascorbic acid. The polymerization initiator may be used in an amount of 0.1 to 10%, especially 0.5 to 5% by weight based on the radical-polymerizable vinyl monomer.

When the solution of the silanol group-bearing silicone resin in the radical-polymerizable vinyl monomer obtained by the above process is emulsion polymerized using the surfactant and polymerization initiator, the emulsion polymerization technique may be any of prior art well-known techniques, for example, a batchwise charging technique of emulsifying the silicone resin/vinyl monomer solution in its entirety followed by polymerization, and a monomer addition technique of polymerizing the silicone resin/vinyl monomer solution while continuously adding a solution or emulsion of radical-polymerizable vinyl monomer. Also useful is a seed polymerization technique of previously polymerizing a part of the emulsified solution and continuing polymerization while adding the remainder of the emulsified solution. A core/shell polymerization technique of changing the monomer composition of core and shell is also applicable. Any of these techniques can restrain highly reactive silanol groups from condensation.

While the emulsion composition of the invention contains as a main component an emulsion polymerized product of a mixture of (A) the silanol group-bearing silicone resin and (B) the radical-polymerizable vinyl monomer as described above, the emulsion composition does not substantially contain flammable organic solvents having a boiling point of lower than 100° C., aromatic organic solvents harmful to humans, and organic solvents non-dispersible or insoluble in water. Examples of the organic solvents include alcohols such as methanol, ethanol, propanol, isopropanol and t-butanol, aromatics such as toluene and xylene, ketones such as acetone and methyl ethyl ketone, esters such as ethyl acetate, butyl acetate and isobutyl acetate, ethers such as diethyl ether and tetrahydrofuran, and acetonitrile. Since these solvents can cause environmental pollution, be harmful to humans, detract from the stability of the emulsion, provide obstruction against formation of a uniform film after application, it is desirable that these solvents are essentially excluded. Nevertheless, as previously described, with the heretofore known methods for preparing composite emulsions of silicone and acrylic resins, it was impossible to form an emulsion substantially free of solvents. This is because the silicone resin containing highly reactive silanol groups at the molecular ends has such nature that in a low molecular weight form, it is soluble in water, but is unstable and likely to largely change with time in the absence of organic solvents, and inversely, in a high molecular weight form, it is fairly stable, but insoluble in water, likely to solidify in the absence of organic solvents and thus difficult to emulsify. For this reason, in the prior art approaches previously described, organic solvents are used in combination, or alkoxysilane compounds or partial hydrolyzates thereof are used as the starting reactant. According to the present invention, prior to emulsion polymerization, the organic solvent including alcohols or other by-products formed during hydrolysis of hydrolyzable silane compounds is removed as much as possible from the solution of the silicone-resin which is polycondensed to such a level that the resin alone is insoluble in water, and the silicone resin is converted into a solution thereof in the radical-polymerizable vinyl monomer. By subjecting this solution to emulsion polymerization, an emulsion substantially free of organic solvents is obtained. Accordingly, the emulsion of the invention can contain an unremovable trace amount of the organic solvent. For avoiding the above problem, the amount of the organic solvent left in the emulsion should preferably be 0 to 5% by weight, more preferably 0 to 2% by weight, based on the first and second components combined.

In one preferred embodiment, the emulsion composition of the invention further contains a film-forming assistant having a boiling point of at least 100° C. The film-forming assistant is soluble in water and left in the coating even after the majority of water is evaporated off and imparts flow to the coating until it is fully cured, that is, maintains a high leveling function. The film-forming assistant is effective particularly when the acrylic polymer produced has a high glass transition temperature. Then all water-soluble organic solvents having a boiling point of at least 100° C. are included. Illustrative, non-limiting examples of the organic solvent used herein include alcohols such as 1-butanol, isobutyl alcohol, 2-pentanol, 3-pentanol, isopentyl alcohol, methyl lactate, ethyl lactate, and 3-methyl-3-methoxybutanol; polyols such as 1,2-propane diol, 1,3-butane diol, 1,4-butane diol, 2,3-butane diol, 1,5-pentane diol, 2-methyl-2,4-pentane diol, glycerin, and trimethylol propane; ethylene glycol derivatives such as 2-butoxyethanol, 2-phenoxyethanol, 2-ethoxyethyl acetate, 2-butoxyethyl acetate, and diethylene glycol monobutyl ether acetate; propylene glycol derivatives such as 1-methoxy-2-propanol, 1-ethoxy-2-propanol, 1-methoxy-2-methylethyl acetate, 1-ethoxy-2-methylethyl acetate, dipropylene glycol, dipropylene glycol monomethyl ether, dipropylene glycol monoethyl ether, and dipropylene glycol monomethyl ether acetate; butylene glycol derivatives such as 3-methoxybutyl acetate; ketones such as cyclohexanone; and esters such as butyl acetate, isobutyl acetate, y-butyrolactone, propylene carbonate, and dibutyl phthalate. Of these, 2-ethoxyethyl acetate, 2-butoxyethyl acetate, diethylene glycol monobutyl ether acetate, 1-ethoxy-2-methylethyl acetate, and dipropylene glycol monomethyl ether acetate are preferred in view of leveling. These organic solvents do not deprive the emulsion of stability and contribute to only the formation of a uniform film because they are less water soluble than low-boiling alcohols such as methanol and ethanol. The film-forming assistant may be added to either the vinyl monomer solution prior to emulsion polymerization or the emulsion subsequent to emulsion polymerization, with equivalent results. The film-forming assistant is preferably added in an amount of 0 to 20 parts by weight per 100 parts by weight of the silanol group-bearing silicone resin and the radical-polymerizable vinyl monomer combined. If more than 20 parts of the film-forming assistant is added, a more amount of the film-forming assistant can be left in the coating at the end of curing to adversely affect the coating. The preferred amount of the film-forming assistant added is 1 to 20 parts, especially 5 to 15 parts by weight per 100 parts by weight of the silanol group-bearing silicone resin and the radical-polymerizable vinyl monomer combined.

The system is preferably adjusted at pH 3 to 9 in order to improve the stability of the silicone resin-containing emulsion. To this end, acidic compounds such as mineral acids and organic acids or basic compounds such as ammonia and inorganic salts are added. Also, combinations of acidic or basic compounds serving as a buffer agent for pH adjustment may be added, for example, acetic acid combined with sodium acetate, and disodium hydrogen phosphate combined with citric acid. Below pH 3 or above pH 9, the surfactant used for emulsion polymerization would undesirably become unstable or silanol groups be likely to condense. More preferably, the system is adjusted at pH 4 to 8.

The emulsion composition of the invention is crosslinkable and curable even in the absence of catalysts if heated. If desired, a silanol condensation catalyst is added to the emulsion composition on use in order to accelerate the curing rate, to enable curing at low temperatures around room temperature, or to achieve improved film characteristics. The curing catalyst for condensation may be selected from prior art well-known ones, for example, hydroxides such as lithium hydroxide, sodium hydroxide, potassium hydroxide, cesium hydroxide, magnesium hydroxide, calcium hydroxide and barium hydroxide; inorganic acid salts of Group IA or IIA metals such as sodium carbonate, potassium carbonate, magnesium carbonate, calcium carbonate, sodium hydrogen carbonate, potassium hydrogen carbonate, lithium chloride, sodium chloride, potassium chloride, cesium chloride, magnesium chloride, calcium chloride, barium chloride, sodium sulfate, potassium sulfate, magnesium sulfate, calcium sulfate, sodium hydrogen sulfate, and potassium hydrogen sulfate; organic acid salts of Group IA or IIA metals such as lithium formate, sodium formate, potassium formate, cesium formate, magnesium formate, calcium formate, barium formate, lithium acetate, sodium acetate, potassium acetate, cesium acetate, magnesium acetate, calcium acetate, barium acetate, sodium oxalate, and potassium oxalate; alkoxides of Group IA or IIA metals such as sodium methylate, potassium methylate, and sodium ethylate; basic compounds such as n-hexylamine, tributylamine, and diazabicycloundecene; quaternary ammonium salts such as tetrabutylammonium chloride; metal-containing compounds such as tetraisopropyl titanate, tetrabutyl titanate, aluminum triisobutoxide, aluminum triisopropoxide, aluminum acetylacetonate, aluminum perchlorate, aluminum chloride, cobalt octylate, cobalt acetylacetonate, zinc octylate, zinc acetylacetonate, iron acetylacetonate, tin acetylacetonate, dibutytin dioctylate, dibutyltin dilaurate, and dibutyltin oxide; acidic compounds such as p-toluenesulfonic acid and trichloroacetic acid; and fluorides such as potassium fluoride, sodium fluoride, tetramethylammonium fluoride, and sodium hexafluorosilicate. These curing catalysts may be used in emulsion form in order to improve their dispersion in water.

Of these, the compounds of Group IA or IIA metal elements are effective, and inter alia, inorganic compounds are preferred for ease of operation and availability. In view of the activity of the curing catalyst, those compounds containing such elements as Li, Na, K and Cs are preferred, with $NaHCO_3$ and $Na_2CO_3$ being most preferred. When these condensation catalysts are added to the emulsion, they may be added alone or in a form diluted with a suitable solvent, typically water.

The condensation catalyst may be used in an amount of 0 to 20 parts by weight per 100 parts by weight of the silanol group-bearing silicone resin and radical-polymerizable vinyl monomer combined. The preferred amount is 0.1 to 10 parts by weight. Less than 0.1 part of the catalyst would be less effective for promoting condensation whereas more than 20 parts of the catalyst would adversely affect the weather resistance, water resistance and appearance of a film.

In order that the condensation catalyst exert its activity to the maximum extent, the emulsion composition having the catalyst blended therein may be maintained at pH 8 to 12. Within this pH range, silanol groups form a salt with a IA or IIA metal element which exhibits catalytic activity. For both the catalyzed and non-catalyzed systems, the emulsion composition of the invention is preferably maintained at pH 3 to 12.

In the emulsion composition of the invention, various ingredients may be blended depending on the desired application. In the case of coating compositions, for example, metal oxide fine particles may be added for improving the hardness and mar resistance of cured film and imparting optical functions, for example, increasing an index of refraction, imparting antistatic properties, or providing UV absorption to impart light resistance. Exemplary metal oxides include silica, alumina, titanium oxide ($TiO_2$), cerium oxide ($CeO_2$), tin oxide ($SnO_2$), zirconium oxide ($ZrO_2$), antimony oxide ($Sb_2O_5$), iron oxide ($Fe_2O_5$), iron oxide, zinc oxide (ZnO), silver, zirconium oxide-doped titanium oxide, rare earth oxides, and mixtures thereof, though not limited thereto. Silica is appropriate for improving the mar resistance of coating compositions.

Where the emulsion composition of the invention is used as paint, it is preferred to further blend therein an extender pigment, coloring pigment or anti-corrosive pigment in the form of inorganic particles because many characteristics including wear resistance, weather resistance, heat resistance, chemical resistance, high index of refraction, and antistatic property are improved. Exemplary pigments include extender and anti-corrosive pigments such as cerium oxide, tin oxide, zirconium oxide, antimony oxide, rare earth oxide, titanium oxide, composite sol of any of these oxides, aluminum, clay, silica flour, diatomaceous earth, talc, mica, kaolin, barite, aluminum hydroxide, zinc hydroxide, aluminum oxide, aluminum silicate, aluminum phosphate, and silica sol, alumina sol, titania sol or zirconia sol dispersed in water or organic solvent such as alcohol, as well as those pigments surface treated with silane coupling agents; coloring pigments such as carbon black, graphite, ceramic black, zinc oxide, iron oxide, cadmium red, chromium oxide, cobalt green, Guignet's green, cobalt blue, Phthalocyanine Blue, Prussian blue, cadmium yellow, titanium yellow, and silver, as well as those pigments surface treated with silane coupling agents; and azo, azo-lake, phthalocyanine, quinacridone, and isoindolinone organic pigments. When any of these pigments is blended in the emulsion, an acidic or neutral one which does not adversely affect the stability of the emulsion is preferably selected. If basic pigments are blended, the emulsion liquid can change its pH to an unstable region. The pigment may be added in an amount of less than 900 parts, preferably less than 500 parts by weight per 100 parts by weight of the solids of the emulsion. A too much amount of the pigment undesirably deprives the emulsion of film formability and prevents the emulsion from forming a uniform coating.

Furthermore, a water-soluble or dispersible organic resin may be blended in the emulsion composition of the invention. The organic resin is used for the purpose of imparting flexibility, softness, adhesiveness, and chemical resistance to the cured coating. Exemplary organic resins include polyvinyl alcohol, water-soluble polyester resins, water-soluble or dispersible epoxy resins, water-soluble or dispersible acrylic resins, water-soluble or dispersible silicone-acrylic resins, and urethane resins. The organic resin may be blended in an amount of less than 50 parts, preferably less than 30 parts by weight per 100 parts by weight of the solids of the emulsion. A too much amount of the organic resin undesirably detracts from heat resistance, weather resistance, etc.

Moreover, any of various prior art well-known additives may be added to the emulsion composition of the invention for the purpose of imparting better film performance insofar as the characteristics of the composition are not adversely affected. Exemplary additives include curing agents (as previously mentioned), dispersants, plasticizers, antifoaming agents, thickeners, preservatives, antibacterial agents, antioxidants, UV absorbers (e.g., benzophenone, triazole, phenyl salicylate, diphenyl acrylate, and acetophenone compounds), hindered amine photo-stabilizers, and extenders (e.g., aluminum paste and glass frit).

The emulsion composition of the invention is applied to a surface of a transparent or opaque substrate to be protected, for example, of metals, ceramics, glass, wood, paper, and plastics and then cured to form a cured film of the emulsion composition on the substrate surface, thereby conferring mar resistance, weather resistance, and chemical resistance to the substrate.

The coating or film may have any desired thickness although an appropriate thickness is 0.01 to 100 pm, especially 0.05 to 80 Mm.

Owing to a high silicone resin content, the silicone resin-containing emulsion composition of the invention cures into a film having high hardness, flexibility, adhesion, weather resistance, and water repellency. The emulsion composition of the invention is thus suitable as undercoating agents in exterior building applications (on metals, ceramics and wood), paint as typified by top-coating agents, protective coating agents on metal surface (e.g., precoated metal), electric charge-controlling coating agents for electrophotographic carriers, and adhesives. If the emulsion composition is formulated to a fairly soft level, it can be applied as a water-repellent coating agent on synthetic leather or a base of cosmetics because a good film is formed simply after evaporation of water. Where the substrate is of metal, the emulsion composition of the invention is useful for the surface protection or undercoating treatment such as corrosion preventive coating of building structural members of iron and stainless steel and building sash members of aluminum, electrodeposition coating for automobiles and electric appliances, and surface protective coating of magnetic powder for use as electrophotographic carriers. Where the substrate is plastic, the emulsion composition of the invention is useful for surface protective coating of plastic plates, magnetic or heat-sensitive recording film, wrapping film, and vinyl cloth and as function-imparting binders. Where the substrate is wood or paper, the emulsion composition of the invention is useful for surface protective coating of ply wood, surface treatment of heat-sensitive recording paper, and water resistance-imparting coating applied to a printed surface. Owing to water repellency, the emulsion composition of the invention is useful for surface protective coating on synthetic leather and other fabrics. The emulsion composition of the invention is also applicable as a water-soluble binder for waterfast printing ink. Where the substrate is an inorganic material, the emulsion composition of the invention is useful for surface protective coating or as surface treating paint on external wall members of mortar, concrete, and cement, ceramic panels (including ALC plates, sizing boards, and gypsum boards), bricks, glass, porcelain, and synthetic marble. The emulsion composition of the invention is also applicable as a base polymer of adhesive. By adding another organic resin or silane coupling agent to the emulsion composition of the invention, there is obtained an adhesive which is effective for providing a bond between substrates of different materials.

The application technique used may be any of conventional well-known techniques, for example, dipping, spraying, roll coating or brush coating. When the emulsion composition of the invention is used as a protective coating in an uncured state, the substrate may be coated with the emulsion composition and left at room temperature for a time to allow water to evaporate. When it is desired to form a fully hard film by allowing the coating to cure at room temperature for crosslinking, the substrate is coated with the emulsion composition having the condensation catalyst added thereto and allowed to stand for 0.1 to 30 days at room temperature whereupon a good cured film is obtained. When it is desired to form a fully hard film by heat curing the coating for crosslinking, the substrate is coated with the catalyzed or non-catalyzed emulsion composition and heated for ½ minute to 200 hours at a temperature of 50 to 300° C.

There has been described a silicone resin-containing emulsion composition comprising a silicone resin-containing emulsion obtained by emulsion polymerization of a mixture containing (A) the silanol group-bearing silicone resin and (B) the radical-polymerizable vinyl monomer. The emulsion composition has the following advantages.

(i) Since both the resins form an interpenetrating network (IPN) structure within emulsion particles, the properties of both the resins are compensated for. The emulsion composition has a high film-forming ability and the resulting film is uniform and flexible and has improved properties including mar resistance, weather resistance, and chemical resistance.

(ii) Silanol groups having high condensation activity are restricted in degree of freedom since the polymers are intertwined in a solventless state with each other within emulsion particles. As a consequence, even a system having a high content of silanol groups has good shelf stability. The maintenance of curing activity ensures a good curing ability even at relatively low temperatures, allowing the composition to find a wider variety of applications.

(iii) When a basic catalyst is used in combination, any of curing modes covering from room temperature curing to heat curing may be employed.

(iv) Since the emulsion composition does not substantially contain low-boiling organic solvents or aromatic organic solvents, a satisfactory film is obtained after drying and curing when a small amount of a film-forming assistant having a boiling point of at least 100° C. is added. Since the volatilization of harmful solvents such as methanol and toluene is minimized or eliminated, an acceptable working environment is ensured.

EXAMPLE

Examples of the invention are given below by way of illustration and not by way of limitation. All parts are by weight.

Preparation Example 1

A 2-liter flask was charged with 408 g (3.0 mol) of methyltrimethoxysilane, and 800 g of water was then added thereto under a nitrogen atmosphere at 0° C. The contents were thoroughly mixed. Under ice cooling, 216 g of a 0.05N hydrochloric acid solution was added dropwise to the mixture over 40 minutes to effect hydrolysis. At the end of dropwise addition, the reaction mixture was agitated for one hour below 10° C. and for a further 3 hours at room temperature to complete hydrolysis.

Then, the methanol formed during hydrolysis and water were distilled off for one hour at 70° C. under a vacuum of 60 Torr. There was left 1,136 g of the solution which was white turbid. The solution was allowed to stand for one day whereupon it separated into two layers. Namely, the silicone resin which then became insoluble in water settled out.

A sample was taken out of the turbid solution. The water-insolubilized silicone resin was separated from the water layer by dissolving it in methyl isobutyl ketone. After dewatering, the amount of silanol groups was determined by reacting the silicone resin with a methyl Grignard reagent. The silanol content was 11.0% by weight based on the silicone resin. On gel permeation chromatography (GPC), the silicone resin had a number average molecular weight of $1.8 \times 10^3$.

The structure of this silanol group-bearing silicone resin was determined by an infrared absorption spectroscopy analysis and $^{29}$NMR analysis. In the IR absorption spectrum of the film from which the solvent was removed by air drying, a broad absorption band attributable to silanol groups was observed centering at 3200 cm$^{-1}$ whereas an absorption peak near 2840 cm$^{-1}$ attributable to the stretching vibration of the carbon-to-hydrogen bond of methoxy group was not observed. As another analysis, an attempt was made to determine the quantity of residual methoxy groups by the alkali cracking method involving distillation, but no methanol was detected, supporting the result of IR absorption spectroscopy. It was judged from these results that the methoxy groups were completely hydrolyzed.

On $^{29}$NMR analysis, the respective structures of T units shown below could be discriminated from different positions of chemical shift developed.

T-1 unit: $CH_3—Si(—O—Si\equiv)_1(—OH)_2$ 46–48 ppm

T-2 unit: $CH_3—Si(—O—Si\equiv)_2(—OH)_1$ 54–58 ppm

T-3 unit: $CH_3—Si(—O—Si\equiv)_3$ 62–68 ppm

On $^{29}$NMR analysis, the silanol group-bearing silicone resin was found to contain 2 mol % of T-1 units, 42 mol % of T-2 units, and 56 mol % of T-3 units.

From these analytical results, the silicone resin was regarded as being represented by the average compositional formula:

$$(CH_3)_{1.0}Si(OH)_{0.44}O_{1.28}.$$

From this compositional formula, a silanol group content of 10.5% by weight was calculated which was well coincident with the measurement.

Next, 210 g of methyl methacrylate (MMA) and 90 g of butyl acrylate (BA) were added to the aqueous solution to dissolve the silicone resin precipitate therein whereupon the MMA/BA solution of the silicone resin was isolated from the water layer. To the isolated solution was added 500 g of water. The mixture was thoroughly agitated and mixed for 10 minutes and allowed to stand whereupon the water layer was separated. The amount of methanol contained in the organic layer was determined by GC, detecting 0.2% by weight in the solution. There was eventually obtained 505 g of a MMA/BA solution having a nonvolatile content of 40.2% by weight (105OC/3 hours), designated Solution A.

Preparation Example 2

A silicone resin was prepared by the same procedure as Preparation Example 1 except that a mixture of 388 g (2.85 mol) of methyltrimethoxysilane and 18 g (0.15 mol) of dimethyldimethoxysilane was used instead of methyltrimethoxysilane, hydrolysis was effected using 400 g of water and 4 g of 1N aqueous acetic acid, and isolation of the water layer was effected using 110 g of MMA and 110 g of BA instead of MMA.

The silanol group-bearing silicone resin thus obtained was similarly analyzed to find that it contained 38 mol % of T-2 units, and had a number average molecular weight of $1.5\times10^3$, the average compositional formula:

$$(CH_3)_{1.0}Si(OH)_{0.40}O_{1.28},$$

and a silanol group content of 9.6% by weight.

There was eventually obtained 411 g of a MMA/BA solution having a nonvolatile content of 49.7% by weight (105° C./3 hours), designated Solution B.

Preparation Examples 3–5 & Comparative Preparation Example 1

Similarly, vinyl monomer solutions having silanol group-bearing silicone resins, designated Solutions C to F, were prepared in accordance with the formulation shown in Table 1.

Comparative Preparation Example 2

A 2-liter flask was charged with 408 g (3.0 mol) of methyltrimethoxysilane and 400 g of acetone, which were thoroughly agitated and mixed under a nitrogen atmosphere at 0° C. Under ice cooling, 324 g (18.0 mol) of a 0.05N hydrochloric acid solution was added dropwise to the mixture over 40 minutes to effect hydrolysis. At the end of dropwise addition, the reaction mixture was agitated for 6 hours at room temperature to complete hydrolysis. There was obtained a solution of a silanol group-bearing silicone resin.

Next, 210 g of MMA and 90 g of BA were added to the solution to dissolve the silicone resin therein whereupon the MMA/BA solution of the silicone resin was isolated from the water layer. To the isolated solution was added 500 g of water. The mixture was thoroughly agitated and mixed for 10 minutes and allowed to stand whereupon the water layer was separated. There was eventually obtained 514 g of a MMA/BA solution having a nonvolatile content of 40.3% by weight (105° C./3 hours), designated Solution G.

The silanol group-bearing silicone resin thus obtained was similarly analyzed to find that it contained 5 mol % of T-1 units and 30 mol % of T-2 units, and had a number average molecular weight of $0.42\times10^3$. From IR absorption spectroscopy, the amount of residual methoxy groups was found to be 3.3% by weight. The resin had the average compositional formula:

$$(CH_3)_{1.0}Si(OCH_3)_{0.07}(OH)_{0.40}O_{1.27}.$$

Comparative Preparation Example 3

A 5-liter flask was charged with 1,300 g of water, 200 g of acetone, and 800 g of toluene. With stirring at room temperature, a mixture of 89.7 g (0.6 mol) of methyltrichlorosilane and 507.6 g (2.4 mol) of phenyltrimethoxysilane was added dropwise over one hour for hydrolysis. The reaction mixture was agitated for 3 hours at 30° C. to complete hydrolysis. This was then allowed to stand whereupon the water layer containing hydrochloric acid was separated and removed. A water washing step consisting of adding 1,000 g of water to the organic layer left, agitating the mixture for 10 minutes, allowing it to stand, separating and removing the water layer was repeated twice. From the silicone resin solution thus obtained, the organic solvent was distilled off in a vacuum of 50 Torr at 50° C. There was collected 329 g of powder silicon resin.

The silanol group-bearing silicone resin thus obtained was similarly analyzed to find that it contained 1 mol % of T-1 units and 16 mol % of T-2 units, and had a number average molecular weight of $1.9\times10^3$. The amount of silanol groups was 2.6% by weight. The resin had the average compositional formula:

$$(C_6H_5)_{0.80}(CH_3)_{0.2}Si(OCH_3)_{0.07}(OH)_{0.40}O_{1.27}.$$

Next, 345 g of MMA and 148 g of BA were added to the silicone resin. There was eventually obtained 822 g of a MMA/BA solution having a nonvolatile content of 40.0% by weight (105° C./3 hours), designated Solution H.

TABLE 1

| | | Inventive Preparation Example | | | | | Comparative Preparation Example | | |
|---|---|---|---|---|---|---|---|---|---|
| Solution designation | | A | B | C | D | E | F | G | H |
| Preparation Example No. | | 1 | 2 | 3 | 4 | 5 | 1 | 2 | 3 |
| Preparation Method | | PE-1 | PE-2 | PE-2 | PE-1 | PE-1 | PE-1 | CPE-2 | CPE-3 |
| Amount of silane reactant blended (mol) | methyltrimethoxysilane | 3.00 | 2.85 | 2.40 | 2.55 | 3.00 | 0.75 | 3.00 | 0.60 |
| | dimethyldimethoxysilane | — | 0.15 | 0.30 | — | — | 1.50 | — | — |
| | γ-methacryloxypropylmethyldimethoxysilane | — | — | 0.15 | — | — | 0.30 | — | — |
| | phenyltrimethoxysilane | — | — | — | 0.15 | — | — | — | 2.40 |
| | decyltrimethoxysilane | — | — | — | 0.15 | — | — | — | — |
| | γ-glycidoxypropylmethyldiethoxysilane | — | — | 0.15 | — | — | 0.15 | — | — |
| | tetraethoxysilane | — | — | — | 0.15 | — | 0.30 | — | — |
| Silanol group-bearing silicone resin | T unit content (mol %) | 100 | 95 | 80 | 95 | 100 | 25 | 100 | 100 |
| | T-2 unit content (mol %) | 42 | 38 | 45 | 37 | 42 | 32 | 30 | 16 |
| | Number average molecular weight ($\times 10^3$) | 1.8 | 1.5 | 1.2 | 1.0 | 1.8 | 0.6 | 0.4 | 1.9 |
| | Silanol group content (wt %) | 11.0 | 9.6 | 9.1 | 12.0 | 11.0 | 2.3 | 9.4 | 2.6 |
| | Methyl group content (mol %) | 100 | 100 | 92 | 89 | 100 | 88 | 100 | 20 |
| Radical-polymerizable vinyl monomer (parts/100 parts of silicone resin) | Methyl methacrylate | 105 | 50 | 50 | 105 | — | 105 | 105 | 105 |
| | Butyl acrylate | 45 | 50 | 50 | 45 | 50 | 45 | 45 | 45 |

Example 1

A polymerizer equipped with a stirrer, condenser, thermometer, and nitrogen gas inlet was charged with 730 parts of deionized water, 0.47 part of sodium carbonate and 4.70 parts of boric acid as a pH buffer, heated to 60° C. with stirring, and then purged with nitrogen. To the polymerizer, 1.75 parts of Rongalit, 0.12 part of a 1% aqueous solution of disodium ethylenediaminetetraacetate, and 0.04 part of a 1% aqueous solution of ferrous sulfate were added. At the same time, a mixture of 700 parts of the silicone resin-containing MMA/BA solution A obtained in Preparation Example 1, 7 parts of γ-methacryloxypropyl-methyldimethoxysilane, 2.1 parts of t-butylhydroperoxide (purity 69%), 14.0 parts of reactive surfactant Aquaron RN-20 (trade name, Daiichi Kogyo Seiyaku K.K.), and 7.0 parts of Aquaron HS-10 (trade name, Daiichi Kogyo Seiyaku K.K.) was uniformly added over 2-½ hours while maintaining the polymerizer at a temperature of 60° C. reaction was continued for a further 2 hours at 60° C. to complete polymerization. 40 parts of 2-butoxyethyl acetate was added as a film-forming assistant to the emulsion, which was thoroughly agitated and mixed, completing the emulsion.

The thus obtained emulsion had a solid concentration of 50.1% and was adjusted to pH 7.0 by adding aqueous ammonia. To this, 3 parts of sodium hydrogen carbonate was added as a curing catalyst. The composition was at pH 8.0.

Example 2

A glass beaker was charged with 700 parts of the silicone resin-containing MMA/BA solution B prepared in Preparation Example 2, 7 parts of γ-methacryloxypropyl-methyldimethoxysilane, 14.0 parts of reactive surfactant Aquaron RN-20 (trade name, Daiichi Kogyo Seiyaku K.K.), 7.0 parts of Aquaron HS-10 (trade name, Daiichi Kogyo Seiyaku K.K.), and 40 parts of 1-ethoxy-2-methylethyl acetate. With stirring by means of a high-speed agitator, 430 g of deionized water was slowly added to the mixture to form an emulsion.

A polymerizer equipped with a stirrer, condenser, thermometer, and nitrogen gas inlet was charged with 230 parts of deionized water, 0.47 part of sodium carbonate and 4.70 parts of boric acid as a pH buffer, heated to 60° C. with stirring, and then purged with nitrogen. To the polymerizer, 1.75 parts of Rongalit, 0.12 part of a 1% aqueous solution of disodium ethylenediaminetetraacetate, and 0.04 part of a 1% aqueous solution of ferrous sulfate were added. At the same time, the above-prepared emulsion was uniformly added to the polymerizer over 2-½ hours while maintaining the polymerizer at a temperature of 60° C. Reaction was continued for a further 2 hours at 60° C. to complete polymerization.

The thus obtained emulsion had a solid concentration of 49.9% and was adjusted to pH 8.0 by adding aqueous ammonia. To this, 10 parts of sodium hydrogen carbonate was added as a curing catalyst. The composition was at pH 9.0.

Examples 3–8 & Comparative Examples 1–4

Similarly, emulsions containing a silanol group-bearing silicone resin, vinyl monomer, film-forming assistant and curing catalyst were prepared in accordance with the formulation shown in Tables 2 and 3.

Comparative Example 5

As in Example 1, emulsion polymerization was similarly carried out using 294 parts of MMA and 126 parts of BA instead of 700 parts of the silicone resin-containing MMA/BA solution A. After the completion of emulsion polymerization, 543 parts of methyltrimethoxysilane (corresponding to 280 parts of the effective component provided that a silicone resin as in Preparation Example 1 is produced) was post added to the emulsion, which was agitated and mixed for one hour at room temperature, obtaining an end emulsion composition.

Comparative Example 6

A polymerizer equipped with a stirrer, condenser, thermometer, and nitrogen gas inlet was charged with 730 parts of deionized water. With stirring, 543 parts of methyltrimethoxysilane was added dropwise over 10 minutes at room temperature. Agitation was continued for 3 hours at room temperature for effecting hydrolysis. At this point, the solution was clear and homogeneous. The polymerizer was then charged with 0.47 part of sodium carbonate and 4.70 parts of boric acid as a pH buffer, heated to 60° C. with stirring, and then purged with nitrogen. To the polymerizer, 1.75 parts of Rongalit, 0.12 part of a 1% aqueous solution of disodium ethylenediaminetetraacetate, and 0.04 part of a 1% aqueous solution of ferrous sulfate were added. At the same time, a mixture of 294 parts of MMA, 126 parts of BA, 2.1 parts of t-butylhydroperoxide (purity 69%), 14.0 parts of reactive surfactant Aquaron RN-20 (trade name, Daiichi Kogyo Seiyaku K.K.), and 7.0 parts of Aquaron HS-10 (trade name, Daiichi Kogyo Seiyaku K.K.) was uniformly added over 2-½ hours while maintaining the polymerizer at a temperature of 60° C. Reaction was continued for a further 2 hours at 60° C. to complete polymerization.

Comparative Example 7

As in Example 1, emulsion polymerization was similarly carried out using 543 parts of methyltrimethoxysilane in 294 parts of MMA and 126 parts of BA instead of 700 parts of the silicone resin-containing MMA/BA solution A, obtaining an end emulsion composition.

Cured coatings of the silicone resin-containing emulsions prepared in Examples 1–8 and Comparative Examples 1–7 were tested by the following procedure. After each of the emulsions was blended with the predetermined amount of the curing catalyst shown in Tables 2 and 3 and thoroughly agitated and mixed, each composition was applied to a clean surface of a cold rolled steel sheet and cured under the conditions shown in Tables 2 and 3 to a cured thickness of 20 $\mu$m. It is noted that when cured at 25° C., the coating was allowed to stand for 7 days under indoor open conditions before it was tested. When cured under other temperature conditions, the coating was cured for 5 minutes at the predetermined temperature before it was tested.

The cured coating was examined for (1) pencil hardness according to JIS K-5400, (2) adhesion by a cross-cut test using Cellophane® adhesive tape, (3) chemical resistance by dropping a 5% NaOH aqueous solution and a 3% sulfuric acid aqueous solution onto the coating, allowing the coating to stand for one day at room temperature, and observing any change of the coating, and (4) weather resistance after 3,000 hours of sunshine exposure by means of Sunshine Long-Life Weatherometer. With respect to (2) adhesion, a coating was rated 100/100 when all 100 sections were held bonded. With respect to (3) chemical resistance and (4) weather resistance, a coating was rated "O" when neither quality change nor coloring was observed, "Δ" when adhesion failure or some yellowing occurred, and "X" when separation or yellowing occurred.

The emulsion itself was examined for shelf stability by allowing it to stand for 30 days at 40° C. and observing the emulsion whether or not layer separation occurred or whether or not gel-like matter formed.

The results are also shown in Tables 2 and 3.

It is noted that for the composition of Comparative Example 4, no cured coating could be examined because the composition gelled before coating.

TABLE 2

| | | | Example | | | | | | | |
|---|---|---|---|---|---|---|---|---|---|---|
| | | | 1 | 2 | 3 | 4 | 5 | 6 | 7 | 8 |
| Composition | Silicone resin | Solution | A | B | C | D | E | A | A | A |
| | | Amount (pbw) | 280 | 350 | 350 | 280 | 467 | 280 | 280 | 280 |
| | Vinyl monomer (pbw) | Methyl methacrylate | 294 | 175 | 175 | 294 | — | 294 | 294 | 294 |
| | | Butyl acrylate | 126 | 175 | 175 | 126 | 233 | 126 | 126 | 126 |
| | | Glycidyl methacrylate | — | — | — | 35 | — | — | — | — |
| | | Acrylic acid | — | — | 20 | — | — | — | — | — |
| | | One end acryl-terminated dimethyl-silicone oil | — | — | — | — | — | — | — | 30 |
| | | γ-methacryloxy-propylmethyldimethoxysilane | 7 | 7 | — | 35 | 7 | 7 | 7 | 7 |
| | | Styrene | — | — | — | 10 | — | — | — | — |
| | | Total | 427 | 357 | 370 | 500 | 240 | 427 | 427 | 457 |

TABLE 2-continued

|  |  |  | Example | | | | | | | |
|---|---|---|---|---|---|---|---|---|---|---|
|  |  |  | 1 | 2 | 3 | 4 | 5 | 6 | 7 | 8 |
|  | Film-forming assistant (pbw) | 2-butoxyethyl acetate | 40 | — | 70 | 100 | 130 | — | 100 | — |
|  |  | 1-ethoxy-2-methylethyl acetate | — | 40 | — | — | — | 70 | — | — |
|  | Curing catalyst (pbw) | Sodium hydrogen carbonate | 3 | 10 | 30 | 70 | — | — | — | — |
|  |  | Sodium carbonate | — | — | — | — | 10 | — | — | — |
|  |  | Sodium hydroxide | — | — | — | — | — | 10 | — | 10 |
|  | Entire composition pH |  | 8 | 9 | 10 | 11 | 8 | 9 | 4 | 9 |
|  | Curing temp. (° C.) |  | 120 | 120 | 25 | 25 | 25 | 120 | 150 | 120 |
| Properties | Pencil hardness |  | 2H | 3H | 3H | 3H | 4H | 2H | 2H | H |
|  | Adhesion |  | 100/100 | 100/100 | 100/100 | 100/100 | 100/100 | 100/100 | 100/100 | 100/100 |
|  | Weather resistance |  | ○ | ○ | ○ | ○ | ○ | ○ | ○ | ○ |
|  | Chemical resistance |  | ○ | ○ | ○ | ○ | ○ | ○ | ○ | ○ |
|  | Emulsion's shelf stability |  | ○ | ○ | ○ | ○ | ○ | ○ | ○ | ○ |

TABLE 3

|  |  |  | Comparative Example | | | | | | |
|---|---|---|---|---|---|---|---|---|---|
|  |  |  | 1 | 2 | 3 | 4 | 5 | 6 | 7 |
| Composition | Silicone resin | Solution | F | G | H | A | silane monomer | silane monomer | silane monomer |
|  |  | Amount (pbw) | 280 | 280 | 280 | 280 | 280 | 280 | 280 |
|  | Vinyl monomer (pbw) | Methyl methacrylate | 294 | 294 | 294 | 294 | 294 | 294 | 294 |
|  |  | Butyl acrylate | 126 | 126 | 126 | 126 | 126 | 126 | 126 |
|  |  | Glycidyl methacrylate | — | — | — | — | — | — | — |
|  |  | Acrylic acid | — | — | — | — | — | — | — |
|  |  | One end acryl-terminated dimethyl-silicone oil | | | | | | | |
|  |  | Styrene | — | — | — | — | — | — | — |
|  |  | γ-methacryloxypropylmethyldimethoxysilane | 7 | 7 | 7 | 7 | 7 | 7 | 7 |
|  |  | Total | 427 | 427 | 427 | 427 | 427 | 427 | 427 |
|  | Film-forming assistant (pbw) | 2-butoxyethyl acetate | 40 | 40 | 40 | 40 | 40 | 40 | 40 |
|  |  | 1-ethoxy-2-methylethyl acetate | — | — | — | — | — | — | — |
|  | Curing catalyst (pbw) | Sodium hydrogen carbonate | 10 | 10 | 10 | — | 10 | 10 | 10 |
|  |  | Sodium carbonate | — | — | — | — | — | — | — |
|  |  | Sodium hydroxide | — | — | — | 150 | — | — | — |
|  | Entire composition pH |  | 9 | 9 | 9 | 13 | 9 | 9 | 9 |
|  | Curing temp. (° C.) |  | 120 | 120 | 120 | 25 | 120 | 120 | 120 |
| Properties | Pencil hardness |  | 5H | 2B | B | — | H | F | F |
|  | Adhesion |  | 10/100 | 100/100 | 100/100 | — | 100/100 | 100/100 | 100/100 |
|  | Weather resistance |  | Δ | × | Δ | — | ○ | Δ | Δ |
|  | Chemical resistance |  | × | Δ | Δ | — | Δ | ○ | ○ |
|  | Emulsion's shelf stability |  | ○ | ○ | Δ | × | × | × | × |

Example 9

An exterior white paint composition was prepared by blending 100 parts of the silicone resin-containing emulsion prepared in Example 1 with 35 parts of neutral titanium oxide pigment and dispersing them in a ball mill. The white paint composition was applied to a sealer-coated thick cement board, air dried, and cured for 5 minutes at 150° C. to a cured thickness of 20 μm. The cured coating had a pencil hardness of H. Separately, the white paint composition was spray coated to an aluminum substrate, air dried, and heat cured for 5 minutes at 150° C.

The two samples thus obtained were examined for weather resistance after 3,000 hours of sunshine exposure by means of Sunshine Weatherometer according to JIS K-5400. As compared with the white coatings before the exposure test, the white coatings after the exposure test remained substantially unchanged in color and appearance and maintained luster. That is, the coatings were fully weather resistant.

The samples were also examined for water resistance by a hot water immersion test (hot water, 60° C., 1 week) and a boiling water immersion test (boiling water, 5 hours). The coatings showed firm adhesion and no change of outer appearance and color.

Example 10

A coating composition was prepared by blending 100 parts of the silicone resin-containing emulsion prepared in Example 1 with 20 parts of a commercially available bisphenol A epoxy resin emulsion (epoxy equivalent 900, effective component 55%). The coating composition was applied to a clean surface of a cold rolled steel sheet, air dried, and heat cured for 30 minutes at 150° C. to a cured thickness of 20 μm.

The cured coating was examined for pencil hardness according to JIS K-5400, chemical resistance by dropping a 5% NaOH aqueous solution and a 3% sulfuric acid aqueous solution onto the coating, allowing the coating to stand for one day at room temperature, and observing any change of the coating, and corrosion resistance by a salt spray test (200 hours) according to JIS K-5400. The cured coating showed a pencil hardness of 3H, high resistance against acid and alkali, firm adhesion, and good chemical resistance. The cured coating remained unchanged after the salt spray test.

Japanese Patent Application No. 082738/1998 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A silicone resin-containing emulsion composition comprising as a main component a silicone resin-containing emulsion obtained by emulsion polymerization of a mixed solution containing (A) 100 parts by weight of a silanol group-bearing silicone resin comprising 30 to 100 mol % of T units represented by the formula: $R^1$—$SiZ_3$, and specifically 30 to 80 mol % of T-2 units having one silanol group represented by the formula: $R^1$—$Si(OH)Z'_2$ among other T units wherein $R^1$ is a substituted or unsubstituted monovalent hydrocarbon group, Z is a OH group, hydrolyzable group or siloxane residue, and Z' is a siloxane residue, said silicone resin having a number average molecular weight of at least 500, and (B) 10 to 1,000 parts by weight of a radical-polymerizable vinyl monomer.

2. The composition of claim 1 wherein said silanol group-bearing silicone resin contains at least 5% by weight of silanol groups.

3. The composition of claim 1 wherein the radical-polymerizable vinyl monomer contains 1 to 100 mol % of an alkyl (meth)acrylate having an alkyl group of 1 to 18 carbon atoms.

4. The composition of claim 1 wherein the radical-polymerizable vinyl monomer contains 0.1 to 10 mol % of a vinyl polymerizable functional group-containing hydrolyzable silane represented by the formula:

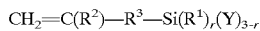
$CH_2$=$C(R^2)$—$R^3$—$Si(R^1)_r(Y)_{3-r}$ wherein $R^1$ is as defined above, $R^2$ is hydrogen or methyl, $R^3$ is a divalent organic group, Y is a hydrolyzable group, and r is equal to 0, 1 or 2.

5. The composition of claim 1 further comprising up to 20 parts by weight of a film-forming assistant having a boiling point of at least 100° C. per 100 parts by weight of components (A) and (B) combined.

6. The composition of claim 1 further comprising up to 20 parts by weight of at least one compound containing a metal element of Group IA or IIA per 100 parts by weight of components (A) and (B) combined.

7. The composition of claim 6 wherein the compound containing a metal element of Group IA or IIA is an inorganic salt of Li, Na, K or Cs.

8. The composition of claim 1 further comprising at least one pigment selected from the group consisting of extender pigments, color pigments and anti-corrosive pigments.

9. The composition of claim 1 further comprising a water-dispersible or water-soluble organic resin.

10. The composition of claim 1 which is at pH 3 to 12.

11. A method for preparing a silicone resin-containing emulsion composition comprising the steps of:

(i) hydrolyzing a hydrolyzable silane compound containing 30 to 100 mol % of a silane represented by the formula: $R^1SiX_3$ wherein $R^1$ is a substituted or unsubstituted monovalent hydrocarbon group and X is a hydrolyzable group in an aqueous solution at pH 1 to 7, thereby obtaining a reaction mixture containing the silanol group-bearing silicone resin (A) set forth in claim 1, (ii) removing hydrolytic by-products from the reaction mixture, yielding a system primarily comprising the silanol group-bearing silicone resin and water, (iii) adding a radical-polymerizable vinyl monomer to the system of step (ii) for dissolving the silanol group-bearing silicone resin in the vinyl monomer, and removing the remaining hydrolytic by-products and water, and (iv) subjecting the silicone resin-containing radical-polymerizable vinyl monomer solution to emulsion polymerization in the presence of a surfactant.

12. The method of claim 11 further comprising the step of adding a film-forming assistant having a boiling point of at least 100° C. to the silicone resin-containing radical-polymerizable vinyl monomer solution in step (iv) before emulsion polymerization is effected in the presence of a surfactant.

13. The method of claim 11 further comprising the step of adding a film-forming assistant having a boiling point of at least 100° C. to the emulsion polymerized product resulting from step (iv).

14. An article having formed on a substrate a cured film of the silicone resin-containing emulsion composition of any one of claims 1 to 10.

15. The composition of claim 1 wherein said T-2 units are contained in an amount of 35 to 70 mol%.

* * * * *